Nov. 5, 1940.                D. S. EDDINS                2,220,321
                    FLUID COUPLING COMPRESSOR DRIVE
                         Filed Sept. 6, 1938
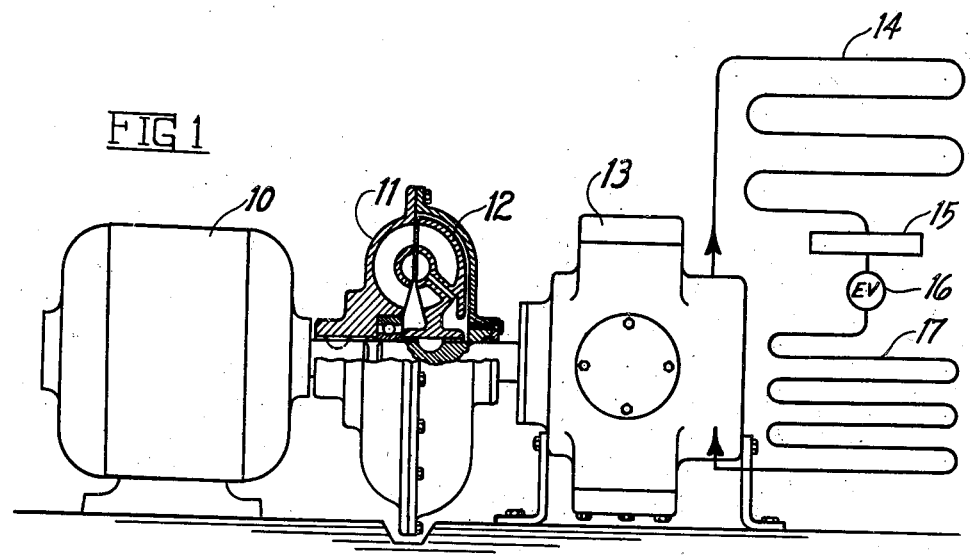
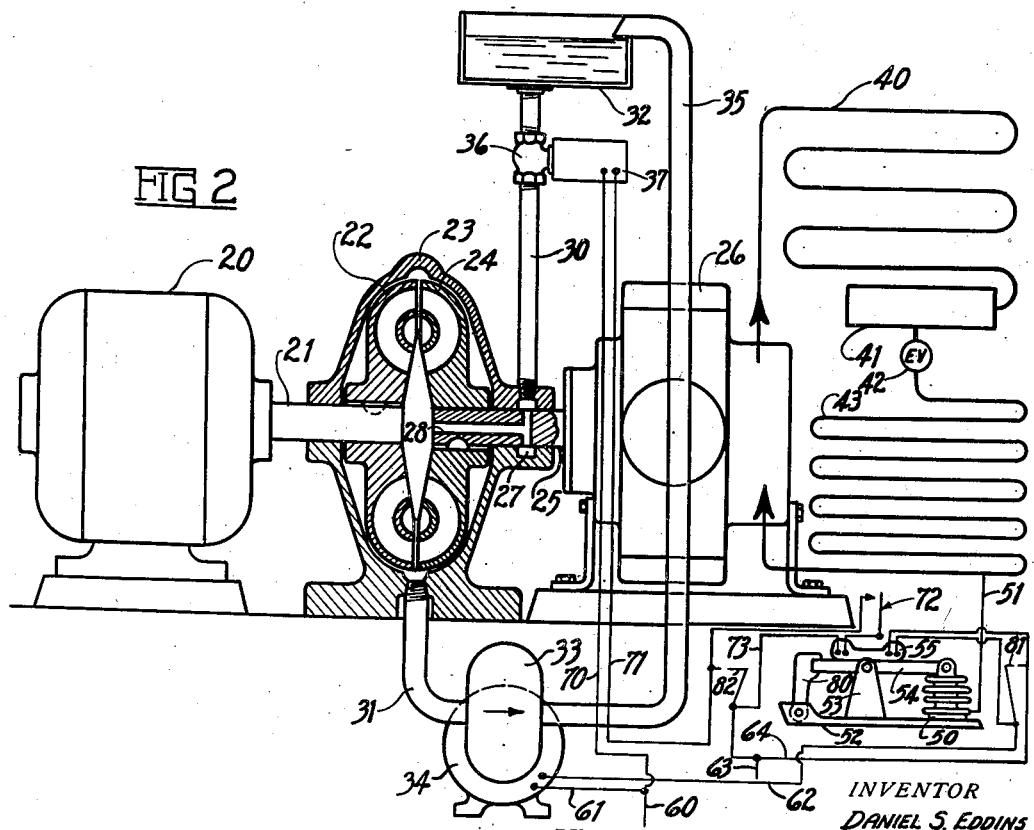
INVENTOR
DANIEL S. EDDINS
BY
Harness, Lind, Patee & Harris
ATTORNEY Patented Nov. 5, 1940

2,220,321

UNITED STATES PATENT OFFICE 2,220,321

FLUID COUPLING COMPRESSOR DRIVE

Daniel S. Eddins, Detroit, Mich., assignor to Chrysler Corporation, Detroit, Mich., a corporation of Delaware Application September 6, 1938, Serial No. 228,481

6 Claims. (Cl. 62—4)

My present invention relates to mechanism whereby the operation of a compressor for use in refrigerating or air conditioning systems may be controlled either manually or automatically through the medium of means to control the operation of a fluid coupling interposed between the prime mover and the compressor. The object of the invention is to simplify the mechanism whereby the operation of the compressor is made automatically or manually responsive to the load on the evaporator of a compressor-condenser evaporator system.

Another object of the present invention is to provide means for driving a compressor, said means comprising a fluid coupling which will permit the motor or other prime mover to come up to speed without being held back by the application of full load, thereby permitting the use of a relatively low-starting torque motor or other prime mover having sufficient energy to carry full load at full speeds but insufficient energy to carry full load at slow speeds.

Other objects and advantages of the present invention will be apparent from a study of the following description taken in connection with the accompanying drawing wherein like numerals refer to like parts throughout.

Referring to the drawing, Fig. 1 discloses the application of a fluid coupling to a combination comprising a motor and a compressor-condenser-evaporator system; and Fig. 2 discloses means whereby the combination of Fig. 1 may be automatically controlled in response to the load upon the evaporator, or manually controlled at will.

In Fig. 1 there is disclosed a motor 10, to the armature shaft of which is attached the driver 11 of a fluid coupling, the driven member 12 of the fluid coupling being connected to the shaft of a compressor 13. The compressor 13 forces hot compressed refrigerant into the condenser 14 from which the condensed refrigerant passes through the receiver 15, expansion valve 16 and evaporator 17 in the usual manner. By the use of the fluid coupling, a low-starting torque motor may be employed as the prime mover since the driven member of the fluid coupling will rotate without appreciably affecting the driven member until higher speeds are achieved, whereby the motor is permitted to come up to full speed before assuming the entire load imposed by the compressor.

In Fig. 2 a motor 20 has its armature shaft 21 fixed to the driving member 22 of a modified form of fluid coupling contained in a housing 23. The driven member 24 is fixed to the shaft 25 of a compressor 26. The housing 23 is mounted upon the common base for the motor and compressor and provides stationary bearings for the motor and compressor shafts, one of the bearings being provided with an annular recess 27 which communicates with a passage 28 drilled through the shaft 25 and extending into the interior of the fluid coupling. A fluid, such as a good grade of lubricating oil, may be admitted to the coupling through a supply pipe 30 and withdrawn through a drain 31. The supply pipe 30 preferably extends to a reservoir 32 providing a slight head in order that any fluid in the housing 23 will not escape therefrom when the coupling is at rest. When the coupling is in operation the action thereof, due to centrifugal force, is to draw fluid into the compressor housing.

The drain pipe 31 provides the suction pipe for a pump 33 driven by a motor 34. When the pump is in operation, fluid may be withdrawn from the interior of the housing 23 and forced through a return pipe 35 into the reservoir 32. The supply pipe 30 is provided with a valve 36 operated by an electric valve motor 37 of any suitable type in order that the fluid may be prevented from passing into the coupling when the valve is closed, as a result of which operation of the pump 33 when the valve is closed will cause the compressor to come to rest even though the motor continues to operate.

The compressor 26 is connected to the usual condenser 40, receiver 41, expansion valve 42 and evaporator 43, the evaporator 43 being the means whereby cooling or refrigerating is accomplished. The expanded refrigerant in the evaporator 43 absorbs heat from the surrounding medium and, as is well known in the art, becomes heated in proportion to the heat load upon the evaporator. If the load increases, the refrigerant enters the compressor 26 at a higher temperature and correspondingly higher pressure, and if the load decreases the refrigerant enters at a lower temperature and lower pressure than normal. In the event that the suction or back pressure of the system is high no harm can result since the system will continue to operate in an attempt to overcome the excessive load. If the back pressure is low damage may occur due to the freezing of any accidentally present moisture in the expansion valve, or due to the formation of ice on the expansion coils, and, in any event, the system should come to rest since the surrounding medium has cooled below the temperature for which the system was designed; accordingly means are provided for stopping the compressor when the back pressure is low. Likewise, means are provided for starting the compressor when the temperature of the surrounding medium becomes excessive, in order that the system may begin operation when cooling is demanded.

The control means comprises a pressure-responsive device 50 such as a Sylphon bellows, the interior of which is connected to the low pressure side of the refrigerating system through a tube 51. The bellows 50 is mounted upon a support 52 which is provided with a fulcrum 53 for a switch lever 54 upon which is mounted a double-ended mercury contactor 55. When the bellows 50 is contracted, due to a low pressure within the evaporator coil, the contacts at one end of the contactor will be engaged, and when the bellows expands, due to high pressure, the opposite contacts will be engaged by the free mercury pool, as is customary in such devices.

When the pressure is low a circuit will be completed as follows: from positive line 60 to motor 34 through wire 61, from motor 34 to contactor 55 through wire 62, from contactor 55 to negative side of line 63 through wire 64, thus starting the motor 34 and causing pump 33 to drain the fluid coupling. The valve 36 is preferably of the type which is closed when the motor 37 is deenergized and opened when electrical energy is supplied to the motor, and the motor 37 is placed in a circuit comprising positive line 60, wire 70, valve motor 37, wire 71, thermostat 72, contactor 55 and wire 73 leading back to negative line 63. When the contactor 53 is in position to close the contacts in the pump circuit, the contacts in the valve circuit will be open and valve 36 will be closed. Therefore, the pump will drain the fluid from the coupling and deposit the same in the tank 32, thus causing the compressor to stop even though the motor may continue to operate. As the temperature of the medium surrounding the expansion coil 43 rises the thermostat 72 will close when a sufficiently high temperature is reached. In the meantime, due to discontinuance of the operation of the compressor, the pressure within the expansion coil has risen and the bellows 50 has expanded to place the mercury contactor 55 across the valve circuit, so that upon completion of the circuit by operation of the thermostat 72 the valve 36 will be opened causing fluid to fill the interior of the coupling and permitting the compressor to commence operating. The fluid coupling is of such a nature that the motor 20 may be operating at full speed but the load will be picked up gradually as the driven member 24 attempts to follow the driving member 22 due to the presence of the fluid within the coupling.

In order to control the system manually, means may be provided whereby the mercury contactor 55 and thermostat 72 are rendered inoperative. Such means may comprise a latch 80 whereby the lever 54 may be locked in position and manual switches in parallel with the mercury tube contacts. In order to drain the fluid coupling a switch 81 may be provided across the line between wires 62 and 64, and in order to fill the fluid coupling a switch 82 may be provided across the line between wires 71 and 73. The manual switches may be used for test purposes or for other reasons well known in the art.

Having described the preferred embodiment of my invention, it should be apparent to those skilled in the art that the same may assume other modifications in arrangement and detail. All such modifications as come within the scope of the following claims are considered to be a part of my invention.

I claim:

1. The combination with the compressor of a compressor-condenser-evaporator system having a constant capacity at constant speed, of means to control the operation of the compressor comprising a constant speed prime mover, a fluid coupling interposed between said prime mover and said compressor, and means to control the torque-transmitting ability of said fluid coupling in response to the load upon the evaporator.

2. The combination with the compressor of a compressor-condenser-evaporator system having a constant capacity at constant speed, of means to control the operation of the compressor comprising a constant speed prime mover, a fluid coupling interposed between said prime mover and said compressor, and means to control the torque-transmitting ability of said fluid coupling in response to the load upon the evaporator comprising a fluid drainage system to remove fluid from said coupling in response to low pressure within said evaporator and a fluid supply system to supply fluid to said coupling in response to high pressure within said evaporator.

3. The combination with the compressor of a compressor-condenser-evaporator system having a constant capacity at constant speed, of means to control the operator of the compressor comprising a constant speed prime mover, a fluid coupling interposed between said prime mover and said compressor, and means to control the torque-transmitting ability of said fluid coupling in response to the load upon the evaporator comprising a fluid drainage system to remove fluid from said coupling in response to low pressure within said evaporator, a fluid supply system to supply fluid to said coupling in response to high pressure within said evaporator, and thermostatic means responsive to the temperature of the medium surrounding said evaporator to prevent the admission of fluid to said coupling until the temperature of said medium rises to a predetermined point.

4. The combination with the compressor of a compressor-condenser-evaporator system having a constant capacity at constant speed, of means to control the operation of the compressor comprising a constant speed prime mover, a fluid coupling interposed between said prime mover and said compressor, and means to control the torque-transmitting ability of said fluid coupling in response to the load upon the evaporator comprising a fluid drainage system including a pump to remove fluid from said coupling in response to low pressure within said evaporator, a fluid supply system including a storage tank into which the fluid from said coupling is discharged by said pump and from which fluid may be supplied to said coupling in response to high pressure within said evaporator, and thermostatic means responsive to the temperature of the medium surrounding said evaporator to prevent the admission of fluid to said coupling until the temperature of said medium rises to a predetermined point.

5. The combination with the compressor of a compressor-condenser-evaporator system having a constant capacity at constant speed, of means to control the operation of the compressor comprising a constant speed prime mover, a fluid coupling interposed between said prime mover and said compressor, and means to control the torque-transmitting ability of said fluid coupling in response to the load upon the evaporator comprising a fluid drainage system including a pump to remove fluid from said coupling in response to low pressure within said evaporator and a motor adapted to be energized in response to low pressure within said evaporator for driving said pump, a fluid supply system including a storage tank into which the fluid from said coupling is discharged by said pump and from which fluid may be supplied to said coupling in response to high pressure within said evaporator and a valve adapted to be opened in response to high pressure within said evaporator to permit such supply of fluid, and thermostatic means responsive to the temperature of the medium surrounding said evaporator to prevent the admission of fluid to said coupling until the temperature of said medium rises to a predetermined point.

6. The combination with the compressor of a compressor-condenser-evaporator system having a constant capacity at constant speed, of means to control the operation of the compressor comprising a constant speed prime mover, a fluid coupling interposed between said prime mover and said compressor, and means to control the torque-transmitting ability of said fluid coupling in response to the load upon the evaporator comprising a fluid drainage system to remove fluid from said coupling in response to low pressure within said evaporator, a fluid supply system including a valve, which when open permits fluid to flow to said coupling and which opens in response to high pressure within said evaporator, and thermostatic means responsive to the temperature of the medium surrounding said evaporator to prevent the opening of said valve in response to high pressure within said evaporator until the temperature of said medium rises to a predetermined point.

DANIEL S. EDDINS.